United States Patent [19]
Ito et al.

[11] 3,753,190
[45] Aug. 14, 1973

[54] CURRENT LIMITING DEVICE

[75] Inventors: Toshio Ito; Toshio Miyamoto; Yuichi Wada; Teijiro Mori, all of City of Amagasaki, Hyogo Prefecture, Japan

[73] Assignee: Mitsubishi Denki Kabushiki Kaisha, Tokyo, Japan

[22] Filed: June 9, 1970

[21] Appl. No.: 44,785

[30] Foreign Application Priority Data
June 10, 1969  Japan.................................. 44/45589
Nov. 1, 1969   Japan.................................. 44/87749

[52] U.S. Cl...................... 337/21, 337/118, 337/158
[51] Int. Cl. ............................................. H01h 87/00
[58] Field of Search.................... 337/114, 115, 116, 337/117, 118, 119, 120, 121, 122, 21, 158, 159, 290

[56] References Cited
UNITED STATES PATENTS
3,488,761  1/1970  Toshio Ito et al. ................. 337/221
3,491,271  1/1970  Weaver et al................. 174/DIG. 5
3,599,137  8/1971  Toshio Ito et al. ............. 337/159 X
3,644,860  2/1972  Yamagata et al................ 337/158 X
3,117,203  1/1964  Hurtle............................. 337/121 X
3,454,833  7/1969  Hurtle............................. 337/119 X
3,513,426  5/1970  Takeo Inowe et al. .......... 337/290 X
3,389,359  6/1968  Harris................................. 337/114
2,074,060  3/1937  McHugh ......................... 337/118 X
1,316,095  9/1919  Illingworth..................... 337/119 X Primary Examiner—Bernard A. Gilheany
Assistant Examiner—F. E. Bell
Attorney—Robert E. Burns and Emmanuel J. Lobato

[57] ABSTRACT

Two electrodes are interconnected in spaced opposed relationship through an electric insulation through which a current limiting material of a self-restoring type extends to normally electrically interconnect both electrodes. The insulation is equal to or higher than the current limiting material in thermal conductivity. Alternatively the current limiting material is partly reduced in cross section and coupled to a pressure relief element. The reduced portion of the current limiting material may be encircled with a material higher in electric resistivity than the limiting material and good in arc-proof property.

3 Claims, 5 Drawing Figures

CURRENT LIMITING DEVICE

CROSS REFERENCES TO RELATED APPLICATIONS

U.S. Pat. No. 3,488,761 entitled "Current Limiting Device" issued on Jan. 6, 1970 to T. Ito et al. and assigned to the present assignee.

BACKGROUND OF THE INVENTION

This invention relates to improvements in a current limiting device of a self-restoring type operative to limit an excessive current flowing therethrough and to be self-restored to its original electrically conductive state after a predetermined interval of time.

In current limiting devices of the self-restoring type referred to it is very desirable to increase the magnitude of the overload current endurable by the device and also to cause the process of evaporating the current limiting material involved to be uniformly effected while repeatedly performing the current limiting operation with a good reproduciblity.

SUMMARY OF THE INVENTION

The invention resides in a current limiting device comprising a first metallic electrode and a second metallic electrode disposed in spaced opposed relationship an electric insulation disposed so as to mechanically connect the first electrode to the second electrode and electrically insulate the first electrode from the second electrode, an opening extending through at least the electric insulation and disposed between the first and second electrodes, an amount of current limiting material filling said opening, said current limiting material being in a selected one of solid and liquid states at room temperature to maintain the first electrode electrically conductive to the second electrode and responding to a flow of current therethrough in excess of a predetermined magnitude to be evaporated thereby to perform a current limiting operation, at least that portion encircling the current limiting material of the electric insulation being formed of a material at least equal in thermal conductivity to the current limiting material.

Preferably the opening may be partly reduced in cross sectional area.

Accordingly, it is an object of the invention to provide a new and improved current limiting device of self-restoring type having a very great magnitude of overload current endured by the same.

It is another object of the invention to provide a new and improved current limiting device capable of repeatedly performing the current limiting operation with a good reproducibleness while increasing in useful life.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

Figure 1:
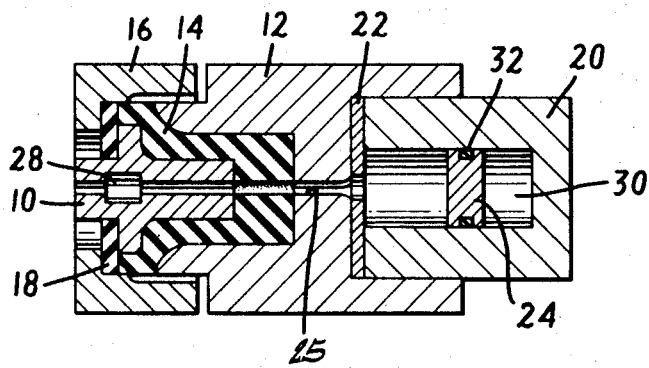
FIG. 1 is a schematic longitudinal sectional view of a current limiting device constructed in accordance with the principles of the invention.

Referring now to the drawing and particularly to FIG. 1, it is seen that an arrangement disclosed herein comprises a first metallic electrode 10, a second metallic electrode 12 opposing to and partly encircling the first electrode 10 to form a gap therebetween which is filled with an electric insulation 14 serving to maintain both electrodes in place and in electrically insulated relationship, an outer metallic cylindrical member 16 for supporting the second electrode 12 and the insulation 14, and an annular disc 18 of electrically insulating material disposed between the first electrode 10 and the outer cylindrical member 16 to electrically insulate the two from each other. The second electrode 12 is provided on that end portion remote from the first electrode 10 with a recess into which a leading electrode 20 in the form of a container is snugly fitted with an antiarc barrier 22 with a central aperture interposed therebetween. A piston 24 is slidably disposed in the hollow portion of the leading electrode 20 to divide it into two compartments.

As shown in FIG. 1, a longitudinal opening 25 extends centrally through the first electrode 10, the insulation 14 and the second electrode 12 and communicates with that compartment near to the first electrode 10 in the leading electrode 20 through the central aperture on the barrier 22. The opening 25 has disposed on that portion near to one end positioned within the first electrode 10 a valve 28 for the purpose as will be apparent hereinafter. The other compartment in the leading electrode 20 has a volume of compressed gas 30 filling the same and acting as a pressure relief element. An O-ring 32 is operatively connected to the piston 24 ensuring that both compartments are hermetically isolated from each other.

Any suitable current limiting material 26 is poured into the opening 25 through the valve 28 in its open position until it fills both the opening or passageway 25 and the compartments communicating therewith in the leading electrode 20. Thereafter the valve 28 is put at its closed position. As will be well known, the current limiting material 26 is in the form of a solid or a liquid at room temperature and responsive to an excessive current such as a short-circuiting current flowing therethrough to be evaporated in the corresponding vapor high in vapor pressure. The evaporated material presents to that flow of current an electric resistance much higher than the shortcircuiting impedance of the associated circuit thereby to limit the shortcircuiting current below a predetermined magnitude while substantially insulating the first electrode 10 from the second electrode 12 for a predetermined period of time. After the completion of the current limiting operation or after both electrodes have been maintained in electrically insulated relationship the evaporated material is rapidly cooled to be solidified or liquidized as the case may be whereupon it is self-restored to its original good electrically conductive state in which both electrodes 10 and 12 are again electrically interconnected. Thus the device is ready for the succeeding operation. Preferred examples of the current limiting material involve sodium (Na), potassium (K), alloys thereof (NaK), gallium (Ga) etc.

Upon evaporating the current limiting material a very high pressure occurs within both the opening 25 and the compartment communicating therewith in the leading electrode 20. This pressure tends to move the piston 24 in the righthand direction as viewed in FIG. 1 to compress the compressed gas 30 in the other compartment. Therefore the pressure is absorbed through the compression of the gas 30 ensuring that the device is prevented from damaging.

With the current limiting material 26 evaporated, the material encircling the evaporated material is subject to a very high temperature environment. Particularly the electric insulation 14 through which the current limiting material 26 extends is required to be formed of a material withstanding at least 1,000° K. Suitable examples of such an insulating material involve ceramics such as alumina ($Al_2O_3$), beryllia (BeO), LUCALOX (trade mark) etc. Further the insulation 14 may be formed of a heat resisting ceramic consisting essentially of magnesium oxide (MgO), glass, mica etc. by means of a hot pressure molding technique. Such a ceramic may include another metallic salt(s). The heat resisting ceramic is commercially available under the name of Hishilex or Mycalex.

Also one of the performances required for current limiting devices is to permit an overcurrent whose magnitude is equal to from 1.25 times to 20 times the rated current for the device to flow through the current limiting material for a period of time determined by the particular magnitude of overcurrent without the material evaporated. In order to prevent that portion of the device disposed between the first and second electrodes 10 and 12 respectively from being brought into its electrically isolated state below a predetermined magnitude of current flowing therethrough due to the evaporation of the current limiting material 26, the latter matieral extending through the insulation 14 between the electrodes 10 and 12 is required not to be evaporated by means of a Joules heat generated therein due to an eddy current circulating through the material. This requirement for the current limiting material will now be mathematically discussed with reference to FIG. 2.

Figure 2:
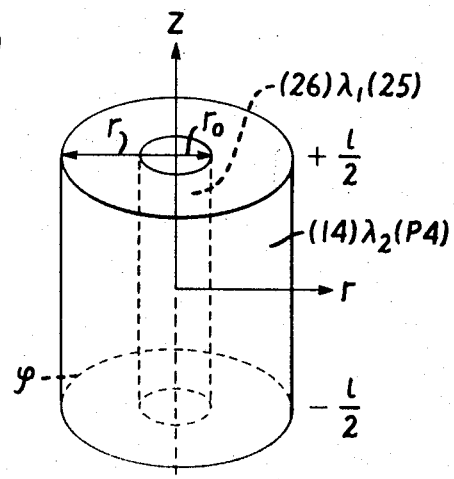
FIG. 2 is a fragmentary perpsective view useful in explaining the principles of the invention.

FIG. 2 is a model view illustrating the manner in which the current limiting material or element 26 is snugly extending through the insulation 14. As shown in FIG. 2, it is assumed that both the insulation and the current limiting element are in the form of cylinders coaxially disposed and symmetric with respect to their common axis. Also it is assumed that the current limiting element 26 uniformly generates heat through a flow of an overcurrent therethrough. Under the assumed condition the following partial differential equation is held:

$$\nabla^2 T = 1/K \, \delta T/\delta t - \zeta I^2/\lambda \quad (1)$$

where
$\nabla^2$ = Laplacian
$T$ = temperature of the current limiting element 26
$K$ = rate of heat emission of the current limiting element 26
$t$ = time,
$\zeta$ = specific resistance of the current limiting element 26
$I$ = current flowing through the current limiting element 26
$\lambda$ = thermal conductivity of current limiting element.

Using a cylindrical coordinate system $(r, \phi, z)$ where the $z$ axis coincides with the common longitudinal axis of both cylinders 25 and 14, the equation (1) is reduced to $$\delta^2 T/\delta z^2 + 1/r \, \delta/\delta r(r \delta T/\delta r) = 1/K \, \delta T/\delta t - \zeta I^2/\lambda \quad (2)$$

on the assumption that all the $\phi$ components are negligible. Assuming that the electrically insulating material of the insulation 14 has been selected to have a sufficiently high thermal conductivity and therefore the current limiting material is equal in temperature to the insulating material, the partial differential equation (2) is multiplied by $2\pi r$ and integrated with respect to $r$ over the $r$ range of from 0 to R (see FIG. 2) to give $$\int_0^R 2\pi r \cdot \lambda \frac{\partial^2 T}{\partial z^2} \cdot dr + \left[ 2\pi r \cdot \lambda \frac{\partial T}{\partial r} \right]_0^R$$
$$= \int_0^R 2\pi r C p \cdot y \cdot \frac{\partial T}{\partial t} dr - \int_0^R 2\pi r \rho I^2 dr \quad (3)$$

where
$Cp$ = specific heat at any given point $(r)$
$r$ = specific weight at any given point $(r)$ holding
$K = \lambda/Cpy$.

Since the current limiting element and insulation are shown in FIG. 2 as having radii of $r_o$ and R respectively, the equation (3) is calculated at $$\delta^2 T/\delta z^2 = 1/K_e \cdot \delta T/\delta t - \zeta_e/\lambda_e I^2 \quad (4)$$

where $\lambda_e = \lambda_1 \pi r_o^2 + \lambda_2 (\pi R^2 - \pi r_o 2)/\pi R^2$ $(Cpy)_e = Cp_1 y_1 \cdot \pi r_o^2 + Cp_2 y_2 (\pi R^2 - \pi r_o^2)/\pi R^2$ $K_e = \pi_e/(Cpy)_e \quad (5)$ $\zeta_e = \zeta_1 \pi r_o^2/\pi R^2$ In the above equations (5) the suffixes 1 and 2 denote the current limiting element and the insulation respectively. For example, $\lambda_1$ designate the thermal conductivity of the current limiting material and $Y_2$ designates the specific weight of the insulating material.

Solving the equation (4) yields $$T(z, t) = \frac{\rho_e}{2\lambda_e} I^2 \left[ \left(\frac{l}{2}\right)^2 - z^2 \right]$$
$$- \left[ \sum_n \frac{\rho e I^2}{\lambda_e} \cdot K_o \cdot e^{p_i t} \frac{\cos \frac{\pi(2n-1)}{l} \cdot z}{p_i^2 l^2 \sin \frac{\pi}{2}(2n-1)} \times 4K_e \pi(2n-1) \right] \quad (6)$$

where $l$ is the axial length of the current limiting element and therefore of the insulation and pi is a thermal time constant expressed by $pi = \pi^2 (2n-1)^2 l^2 \lambda_e/Cpy$ with $n$ being any integer. As shown in FIG. 2, each end face of the cylinder is labelled $+l/2$ or $-l/2$ so that the cylindrical coordinate system has it origin at the middle point of the length of the common axis of the cylinders.

From the equation (6) it is seen that a rise in temperature is a function of $\lambda_e$, $l$, $I^2$ and $\zeta_e$. Among those parameters only $\lambda_e$ and $l$ can be randomly selected. However, the length $l$ is subject to some limitation due to a quantity of heat generated in the current limiting material in view of both the rated current for the particular current limiting device and the thermal severity to which the insulating material is subject upon evaporating the current limiting material. Therefore what can be selected at will is $\lambda_e$ that will subsequently be mathematically considered.

A first one of the equations (5) will be reduced to $$\lambda_e = \lambda_2 + \pi r_o^2/\pi R^2 (\lambda_1 - \lambda_2)$$

From the above equation it is seen that, in order to render $\lambda_e$ as large as possible regardless of the ratio of $r_o/R$, it is required to render $\lambda_1$ approximately equal to $\lambda_2$ (or $\lambda_1 \approx \lambda_2$) while $\lambda_2$ is large. Also it will readily be seen that with the ratio of $r_o/R$ small, a further increase in $\lambda_e$ requires to hold $\lambda_1 << \lambda_2$.

Sodium potassium, their alloys etc. used as current limiting material have a thermal conductivity $\lambda$, in this case $\lambda_1$ in the order of 0.1 Cal/sec. cm. °C. On the other hand, beryllia (BeO) providing an electrically insulating material has its thermal conductivity $\lambda_2$ of approximately 0.5 Cal/sec. cm. °C. Therefore a combination of any one of the current limiting materials just described with the beryllia approximately fulfils the relationship of $\lambda_1 << \lambda_2$.

While an insulating material such as beryllia inherently high in thermal conductivity is, of course, effective for use with the present invention such an insulating material may be replaced, for example, by any hot pressure molding consisting essentially of mica, glass and a metallic oxide having mixed therewith a powdered metal high in thermal conductivity with satisfactory result. For example, an insulating material available under the name of Hishilex or Mycalex as above described may be mixed with powdered copper and molded into any desired magnitude of thermal conductivity or into electrically resistive members for example a thermet as described in the above cited U.S. patent.

Figure 3:
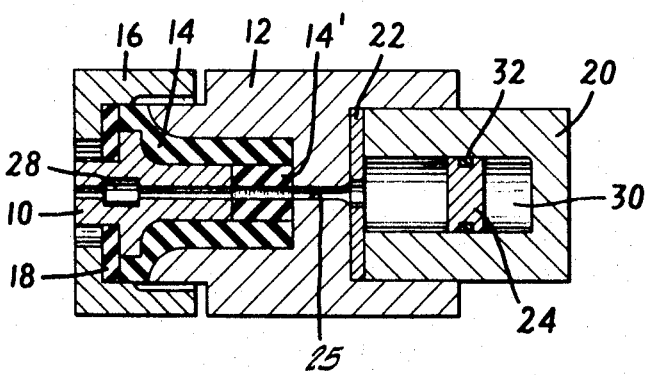
FIG. 3 is a schematic longitudinal sectional view of a modification of the device shown in FIG. 1.

FIG. 3 wherein like reference numerals designate the components identical to those shown in FIG. 1 shows a modification of the device as illustrated in FIG. 1. The arrangement illustrated is different from that shown in FIG. 1 only in that in FIG. 3, the electric insulation includes one portion 14' formed of an insulating material only high in thermal conductivity to directly encircle the current limiting material 26 and the remaining portions 14 formed of an insulating material good in heat resisting property and high in thermal conductivity. For example the insulation portion 14' may be formed of a material just described and the insulation portion 14 may be formed of beryllia (BeO) or alumina ($Al_2O_3$).

Figure 4:
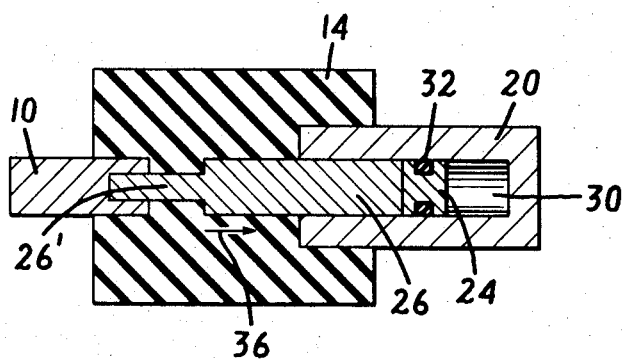
FIGS. 4 and 5 are schematic longitudinal sectional views of different modifications of the invention.

FIG. 4 wherein like reference numerals designate the components identical or corresponding to those illustrated in FIG. 1 shows another modification of the invention. In FIG. 4, the first electrode 10 is rigidly connected in electrically insulated relationship to the leading electrode 20 providing the second electrode, through the electric insulation 14. The current limiting material serving to electrically interconnect both electrodes 10 and 20 partly decreases in cross sectional area. Specifically, that end portion 26' of the current limiting material adjacent the first electrode 10 is smaller in cross sectional area than the remaining portion 26 thereof as shown in FIG. 4. To this end, the opening in the insulation 14 is complementary in configuration to the current limiting material 26 – 26'.

With the arrangement illustrated it will be readily appreciated that upon the occurrence of any excessive current, the reduced portion 26' of the current limiting material is first evaporated and then the evaporation proceeds toward the remaining portion 26 thereof with the result that the evaporation is uniformly caused in the direction of the arrow 36.

Within the electrode 20 the piston 24 cooperates with the compressible medium 30 to be effective for causing the evaporation resulting from the preceding evaporation of the reduced material portion 26' to rapidly proceed in the direction of the arrow 36. More specifically, the reduced portion 26' of the current limiting material is first evaporated to establish a very high pressure to compress the compressible medium 30 while moving the piston 24 in the direction of the arrow 36. It has been found that these operations of the compressible medium 30 and piston 24 are very effective for inducing the evaporation originating from the reduced material portion 26' in the direction of the arrow 36 whereby to aid and promote in performing an excellent stable current limiting operation. Therefore the arrangement of FIG. 4 ensures an indefinite number of current limiting operations with a good reproducibleness.

It has been also found that the provision of the reduced material portion 26' disposed adjacent the first electrode 10 is effective for conducting and dissipating heat generating in that portion with normal magnitude of current flowing therethrough.

Figure 5:
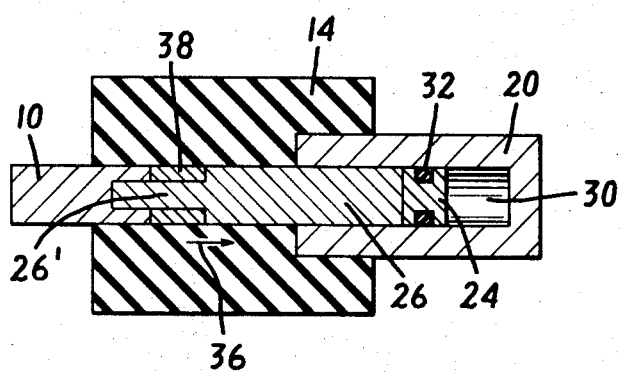

FIG. 5 wherein like reference numerals designate the components identical to those illustrated in FIG. 3 shows still another modification of the invention. The arrangement illustrated is identical to that shown in FIG. 3 excepting that the reduce portion 26' of the current limiting material as shown in FIG. 3 is encircled with a sheath 38 formed of any suitable metallic material high in electric resistivity and good in arc-proof property such as any of nickel alloys and molybdenum alloys. The sheath 38 is effective for preventing the insulation 14 from damaging due to an arcing of the reduced current limiting portion 26'. It has been found that the sheath 38 is preferably formed of Monel metal or HASTELLOY (trade mark) having a resistivity in the order of 170 megohms-centimeter.

In summary the invention provides a current limiting device of self-restoring type including an amount of current limiting material extending through an electric insulation formed at least partly of an electrically insulating material at least equal in thermal conductivity to the current limiting material. This permits heat generated in the current limiting material to be effectively dissipated and ensures that the current limiting material is maintained in its original good electrically conductive state with no evaporation unless a current flowing therethrough exceeds a predetermined magnitude.

In order to render the process of evaporating the current limiting material uniform to perform the current limiting operation with a good reproducibleness, the current limiting material may partly reduce in cross sectional area. Also a pressure relief element may be disposed in opposite relationship with respect with the reduced portion of the current limiting material in order to effectively take advantage of the effect of the pressure relief element that the evaporation of the current limiting material is induced. Further the reduced portion of the current limiting material may be encircled with a sheath formed of a material high in resistivity and good in arc-proof property whereby the device performs the stable operation of limiting current while increasing in useful life.

While the invention has been illustrated and described in conjunction with a few preferred embodiments thereof it is to be understood that various changes and modifications may be resorted to without departing from the spirit and scope of the invention. For example, the compressed gas 30 may be replaced by a compression spring.

What we claim is:

1. A current limiting device comprising, a first metallic electrode and a second metallic electrode disposed in spaced opposite relationship, an electric one-piece insulator made of beryllia disposed so as to mechanically connect the first electrode to the second electrode and electrically insulate said first electrode from said second electrode and having a channel extending therethrough and disposed between said first and second electrodes, an amount of current-limiting material filling said channel said current limiting material being in a selected one of a solid and liquid original states at room temperature to maintain the first electrode electrically connected to the second electrode and responding to a flow of current therethrough in excess of a predetermined magnitude to be evaporated thereby to perform a current limiting operation, said current-limiting material being self-restoring to its original state when the excess of current flow terminates, at least that portion encircling said current limiting material of said electric insulator comprising a material at least equal in thermal conductivity to said current limiting material, and said second electrode having disposed therein a single pressure relief means in communication with said channel for maintaining a pressure within said channel due to the evaporation of said current-limiting material, below a predetermined value.

2. A current limiting device as claimed in claim 1 in which an end portion of said channel remote from said pressure relief means has a reduced cross sectional area.

3. A current limiting device as claimed in claim 1, wherein an end portion of said channel remote from said pressure relief means has a reduced cross sectional area, and further comprising means disposed circumferentially of said end portion comprising a material having a higher resistivity than that of said current-limiting material and having good arc-proof properties.

* * * * *